(12) United States Patent
Deluca et al.

(10) Patent No.: US 11,188,396 B2
(45) Date of Patent: Nov. 30, 2021

(54) PENDING NOTIFICATION DELETION THROUGH AUTONOMOUS REMOVAL TRIGGERING

(71) Applicant: INTERNATIONAL BUSINESS MACHINES CORPORATION, Armonk, NY (US)

(72) Inventors: Lisa Seacat Deluca, Baltimore, MD (US); Kelley Anders, East New Market, MD (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/564,811

(22) Filed: Sep. 9, 2019

(65) Prior Publication Data
US 2021/0073052 A1    Mar. 11, 2021

(51) Int. Cl.
*G06F 9/54*      (2006.01)
*G06N 5/02*      (2006.01)
*G06F 40/205*    (2020.01)

(52) U.S. Cl.
CPC .............. *G06F 9/542* (2013.01); *G06F 9/546* (2013.01); *G06F 40/205* (2020.01); *G06N 5/02* (2013.01)

(58) Field of Classification Search
CPC .......... G06F 9/542; G06F 9/546; G06F 9/547; G06F 40/205; G06N 5/02
See application file for complete search history.

(56) References Cited

U.S. PATENT DOCUMENTS

| 6,757,713 | B1 | 6/2004 | Ogilvie |
| 8,219,115 | B1* | 7/2012 | Nelissen ............... H04W 4/021 455/456.3 |
| 8,234,339 | B2 | 7/2012 | Adams |

(Continued)

FOREIGN PATENT DOCUMENTS

| JP | 2016194089 A1 | 6/2017 |
| WO | 2018165470 A1 | 9/2018 |

OTHER PUBLICATIONS

Anonymous, "A push system for content based identification and deletion of messages on mobile phones", An IP.com Prior Art Database Technical Disclosure, IP.com No. IPCOM000243757D, IP.com Electronic Publication Date: Oct. 16, 2015, 5 pages.

(Continued)

*Primary Examiner* — Charles E Anya
(74) *Attorney, Agent, or Firm* — Kenneth Han (57) ABSTRACT

A method, computer system, and computer program product for autonomous pending notification deletion are provided. The embodiment includes receiving a notification queue associated with a user on a user device. The embodiment also includes retrieving data related to multiple notifications from a user electronic calendar. The embodiment further includes determining a user current location. The embodiment also includes comparing each notification in the notification queue against the determined user current location. The embodiment further includes deriving a notification decision model based on the received notification queue, retrieved data, and the user current location. The embodiment also includes performing an action to manage the notification queue based on the derive notification decision model.

20 Claims, 6 Drawing Sheets

(56) References Cited

U.S. PATENT DOCUMENTS

| | | | |
|---|---|---|---|
| 8,391,448 B2 | 3/2013 | Vander Veen | |
| 9,462,570 B1 | 10/2016 | Bostick | |
| 2002/0085027 A1* | 7/2002 | Kim | H04M 15/83 |
| | | | 715/738 |
| 2002/0087649 A1* | 7/2002 | Horvitz | G06Q 10/107 |
| | | | 709/207 |
| 2006/0203620 A1* | 9/2006 | Bedingfield, Sr. | G06F 3/0481 |
| | | | 368/247 |
| 2008/0185772 A1 | 8/2008 | Duarte | |
| 2008/0305815 A1* | 12/2008 | McDonough | H04M 1/72552 |
| | | | 455/466 |
| 2011/0029598 A1* | 2/2011 | Arnold | H04L 67/26 |
| | | | 709/203 |
| 2011/0217954 A1 | 9/2011 | Lee | |
| 2012/0278396 A1 | 11/2012 | Vuong | |
| 2013/0124321 A1* | 5/2013 | Yamane | G06Q 30/0261 |
| | | | 705/14.57 |
| 2013/0275220 A1* | 10/2013 | Bonk | G06Q 30/0261 |
| | | | 705/14.58 |
| 2014/0052536 A1* | 2/2014 | McAndrew | G06Q 30/0267 |
| | | | 705/14.58 |
| 2015/0356609 A1* | 12/2015 | Shiota | G06Q 30/02 |
| | | | 705/14.58 |
| 2016/0155151 A1* | 6/2016 | Bandara | G06Q 30/0255 |
| | | | 705/14.58 |
| 2016/0231902 A1* | 8/2016 | Sirpal | G06F 3/04883 |
| 2016/0292737 A1* | 10/2016 | Barnes, Jr. | G06Q 10/02 |
| 2017/0098195 A1* | 4/2017 | Douglas | G06Q 10/06 |
| 2017/0300972 A1* | 10/2017 | Moon | G06Q 30/0267 |
| 2018/0013844 A1 | 1/2018 | Foged | |
| 2018/0324122 A1 | 11/2018 | Schwartz | |
| 2019/0349477 A1* | 11/2019 | Kotak | H04M 3/42221 |
| 2020/0065307 A1* | 2/2020 | Roy | G06F 3/04842 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

PENDING NOTIFICATION DELETION THROUGH AUTONOMOUS REMOVAL TRIGGERING

BACKGROUND

The present invention relates, generally, to the field of computing, and more particularly to electronic notification systems.

An electronic notification system is a combination of software and hardware that provides a means of delivering a message to a set of recipients. A push notification is a message that is pushed from a backend server or application to user interfaces, such as mobile applications and desktop applications. The content of the messages can be, for example, chat messages, vendor special offers, event reminder, and subscribed topic changes. When the push notification arrives, it can transmit short notifications and messages, set badges on application icons or play alert sounds. Typically, push notifications may be divided into two approaches, local notifications, and remote notifications. For local notifications, the application schedules the notification with the local device's operating systems and if the event's scheduled time is reached, the message is displayed in the application's user interface. Remote notifications are handled by a remote server and require the client application to be registered on the server with a unique key. The server then fires the message against the unique key to deliver the message to the client application via an agreed client/server protocol such as HTTP or XMPP and the client displays the message received.

SUMMARY

According to one embodiment, a method, computer system, and computer program product for autonomous pending notification deletion are provided. The embodiment may include receiving a notification queue associated with a user on a user device. The embodiment may also include retrieving data related to multiple notifications from a user electronic calendar. The embodiment may further include determining a user current location. The embodiment may also include comparing each notification in the notification queue against the determined user current location. The embodiment may further include deriving a notification decision model based on the received notification queue, retrieved data, and the user current location. The embodiment may also include performing an action to manage the notification queue based on the derive notification decision model.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to electronic notification systems. The following described exemplary embodiments provide a system, method, and program product to manage pending electronic notifications for time and location sensitive events based on a calendar, location and event type for pre-event, during-event, and post-event triggers. Therefore, the present embodiment has the capacity to improve the technical field of electronic notifications by deleting notifications that have expired before a user can view them and automatically suppress or delete notifications in accordance with events, and thereby allowing a user to ignore the expired notifications and saving battery and memory consumption of a user device.

As previously described, an electronic notification system is a combination of software and hardware that provides a means of delivering a message to a set of recipients. A push notification is a message that is pushed from a backend server or application to user interfaces, such as mobile applications and desktop applications. The content of the messages can be, for example, chat messages, vendor special offers, event reminder, and subscribed topic changes. When the push notification arrives, it can transmit short notifications and messages, set badges on application icons or play alert sounds. Typically, push notifications may be divided into two approaches, local notifications, and remote notifications. For local notifications, the application schedules the notification with the local device's operating systems and if the event's scheduled time is reached, the message is displayed in the application's user interface. Remote notifications are handled by a remote server and require the client application to be registered on the server with a unique key. The server then fires the message against the unique key to deliver the message to the client application via an agreed client/server protocol such as HTTP or XMPP and the client displays the message received.

Some notifications are time-sensitive. However, such notifications are only cleared from a user mobile notification queue only if the user has logged in and accessed the notification queue. Expired notifications may serve only to frustrate the user that the user missed the time-sensitive notification. For example, if there is a push notification, "Get 20% off if CODEGET20 is used within the next 20 minutes" and a user does not look at the user phone in the last hour, then this coupon may be already expired and the coupon code is unusable. As such, it may be advantageous to, among other things, implement a system capable of removing such notifications from the notification queue on the user device once the notified items are deemed irrelevant or displaying only a higher priority message when there are multiple notifications for the same information.

According to one embodiment, the present invention may configure user preferences and determine the current user location. In at least one other embodiment, the present invention may also analyze the user notification queue to gather data related to calendar events, messages saved in a database and content of the messages to derive a notification decision model. The present invention may further determine what action is needed to take place based on the notification decision model. The present invention may also delete notifications that have expired.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for automatically deleting notifications that have expired before being viewed by a user and suppressing notifications in accordance with events.

Figure 1:
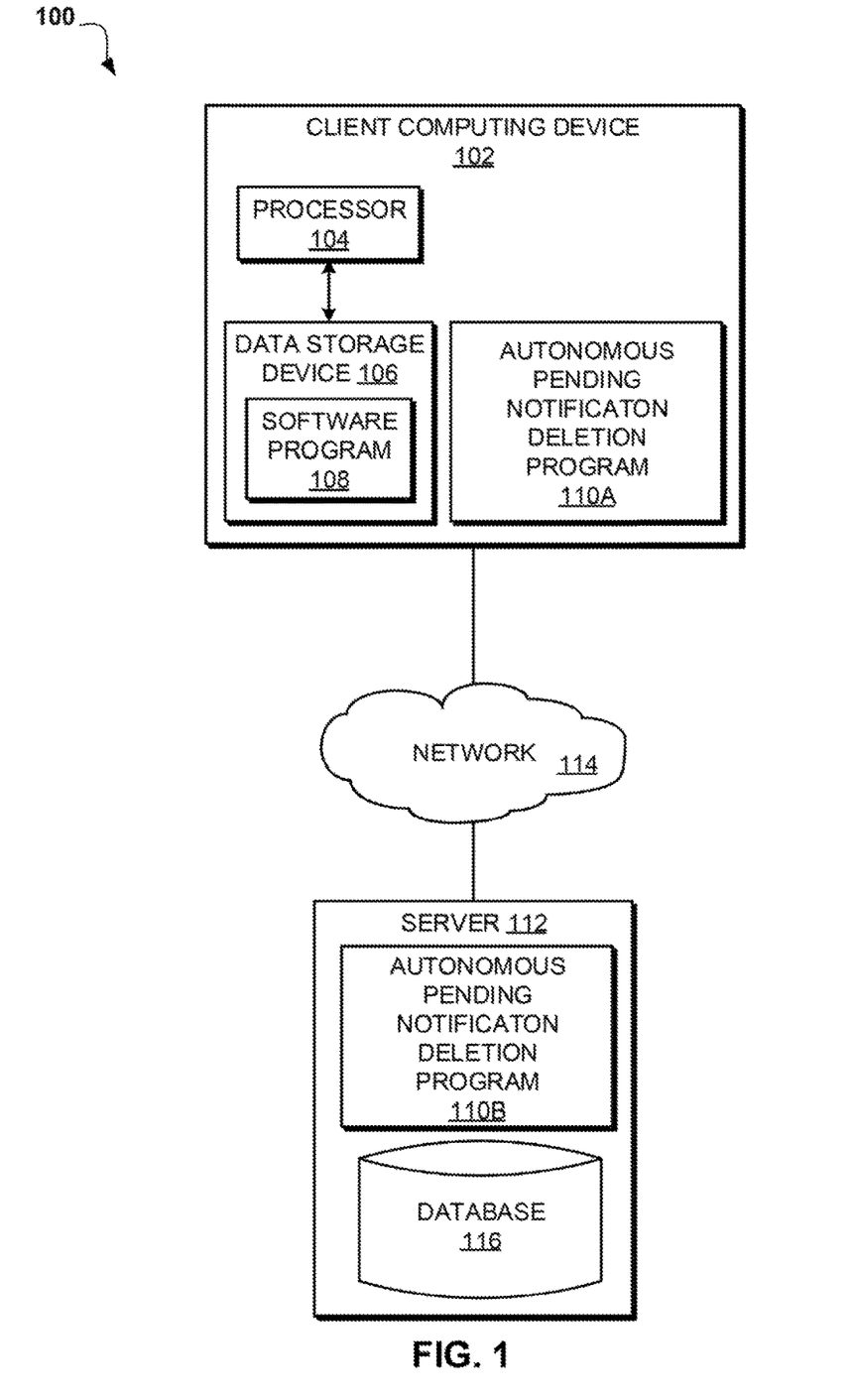
FIG. 1 illustrates an exemplary networked computer environment according to at least one embodiment.

Referring to FIG. 1, an exemplary networked computer environment 100 is depicted according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an autonomous pending notification deletion program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an autonomous pending notification deletion program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the autonomous pending notification deletion program 110A, 110B may be a program capable of analyzing a user notification queue to gather data related to calendar events, messages saved in a database and content of the messages to derive a notification decision model and determining what action is needed to take place based on the notification decision model. The autonomous pending notification deletion process is explained in further detail below with respect to FIG. 2.

Figure 2:
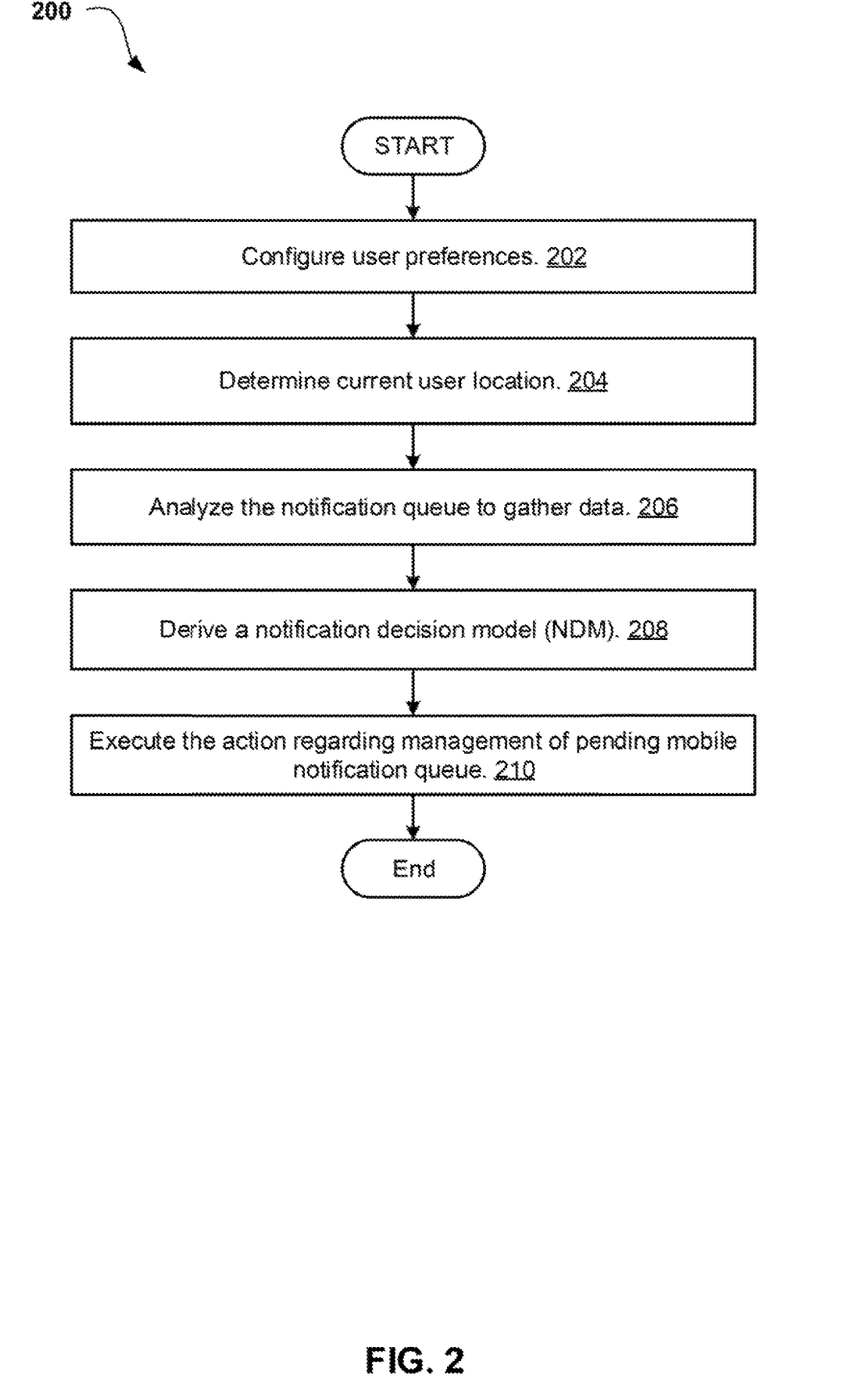
FIG. 2 is an operational flowchart illustrating an autonomous pending notification deletion process according to at least one embodiment.

Referring to FIG. 2, an operational flowchart illustrating an autonomous pending notification deletion process 200 is depicted according to at least one embodiment. At 202, the autonomous pending notification deletion program 110A, 110B configures user preferences. According to one embodiment, the autonomous pending notification deletion program 110A, 110B may allow a user to select websites, services, applications or events from which the user would like to receive notifications or not. Also, a user may select a notification setting for each application or websites such that the user may manually select which applications or websites the user authorizes to send any notifications. The autonomous pending notification deletion program 110A, 110B may implement a user-specific rule that is defined for the user. For example, a user may want to be able to turn the autonomous pending notification deletion program 110A, 110B on or off on particular days of the week or other specific schedules.

At 204, the autonomous pending notification deletion program 110A, 110B determines a current user location. According to one embodiment, the autonomous pending notification deletion program 110A, 110B may determine a current user location using the information provided by a global positioning system (GPS) unit in a smartphone or IP address of a computer, such as client computing device 102, currently in use by a user. The autonomous pending notification deletion program 110A, 110B may detect a user location and use such information when triggering deletion of certain notifications in later steps. For example, the autonomous pending notification deletion program 110A, 110B may utilize a user current location when the user is about to leave or is currently leaving a store and all the notifications related to the store may not be needed after the user left the store. The autonomous pending notification deletion program 110A, 110B may then delete the related notifications at such moment.

At 206, the autonomous pending notification deletion program 110A, 110B analyzes a user notification queue to gather data. According to one embodiment, the autonomous pending notification deletion program 110A, 110B may parse a user's electronic calendar information and extract certain information as to event dates, types, times and locations to store in the database 116. The autonomous pending notification deletion program 110A, 110B may also parse the messages contained in a user queue and extract certain information, such as sources of the messages, dates, times, content of the messages, etc. The autonomous pending notification deletion program 110A, 110B may analyze the content of the messages utilizing NLP technologies to extract the above-mentioned information. Also, the autonomous pending notification deletion program 110A, 110B may identify expiring events, particularly, advertisements that have expiring events and dates.

At 208, the autonomous pending notification deletion program 110A, 110B derives a notification decision model.

According to one embodiment, the autonomous pending notification deletion program 110A, 110B may generate a model in table form as shown in an exemplary table 1 below based on the output at 202-206.

TABLE 1

<Exemplary Table - Notification Decision Model>

| NDM Category | NDM Component Attribute | Potential Value(s) |
| --- | --- | --- |
| User Preferences | Notification settings | Send/Hold |
| Calendar Event | Dates, Times, Locations, Meeting type, etc | Timestamps, GPS coordinates, Building names, Conference room names, Sales offer, meeting, appointment, work session, etc. |
| Message in queue | Sources, Dates, Times, Message content | Advertisement, Social media, Timestamps, Text |

In one embodiment, the autonomous pending notification deletion program 110A, 110B may determine a notification should be deleted, based on the above model, if a preconfigured threshold is met. For example, the autonomous pending notification deletion program 110A, 110B may allow a user to define criteria within the user preferences and messages in a queue, then the autonomous pending notification deletion program 110A, 110B may have specific rules that are defined within the embodiment that may specifically denote usage criteria. For instance, the autonomous pending notification deletion program 110A, 110B may define rules that notification A may not be used at location B but may only be used at location B or vice versa.

At 210, the autonomous pending notification deletion program 110A, 110B executes the action regarding management of pending mobile notification queue. According to one embodiment, the autonomous pending notification deletion program 110A, 110B may determine that certain notifications have expired based on comparison of the current time and date and the notification decision model and delete such notifications before a user can view such expired notifications. In at least one other embodiment, the autonomous pending notification deletion program 110A, 110B may actively suppress or delete notifications in accordance with the status of the extracted events information. (e.g. pre-events, during the events, post-events). In yet another embodiment, the autonomous pending notification deletion program 110A, 110B may keep, delete or archive notifications based on a user-selected option.

Figure 3:
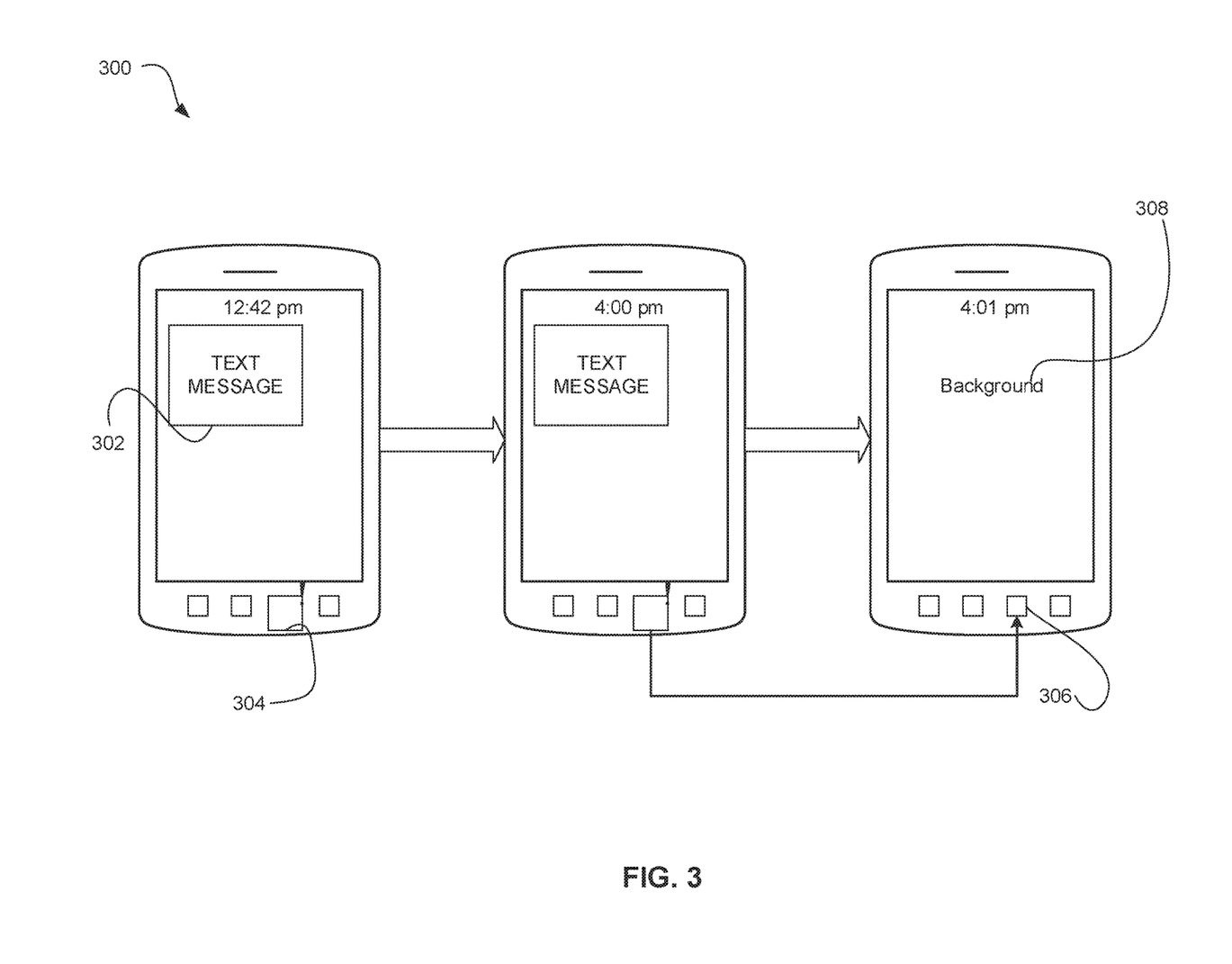
FIG. 3 is a block diagram illustrating an exemplary mobile notification deletion process according to at least one embodiment.

Referring now to FIG. 3, a block diagram illustrating an exemplary mobile notification deletion process 300 is depicted according to at least one embodiment. According to one embodiment, the autonomous pending notification deletion program 110A, 110B may display a text message notification 304 on a user smartphone at 12:42 pm. The text message 304 is, for example, an advertisement message which is effective until 4:00 pm. For example, user A is in New York City and took a ride service to the customer site on Monday morning. Around lunchtime at 12:42 pm, user A receives a text message notification 304 showing that if user A uses the ride service today from 12:00 pm to 4:00 pm, user A will receive a discount today only. The promotion expires at 4:00 pm. At 12:42 pm, the user smartphone displays a notification badge shown on the application icon 304. At 4:00 pm, the user smartphone still displays the same text message 302 and the icon badge 304 has not changed yet. At 4:01 pm, once the time passes 4:00 pm, the text message 302 is no longer displayed on the user smartphone and the application icon 306 has no batch appearing on the icon.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the autonomous pending notification deletion program 110A, 110B may automatically delete a notification if the notification is sales-based or advertisement-based and a user has predefined removal parameters set up based on certain criteria pertaining to a user's relationship with the vendor, company, seller or firm.

Figure 4:
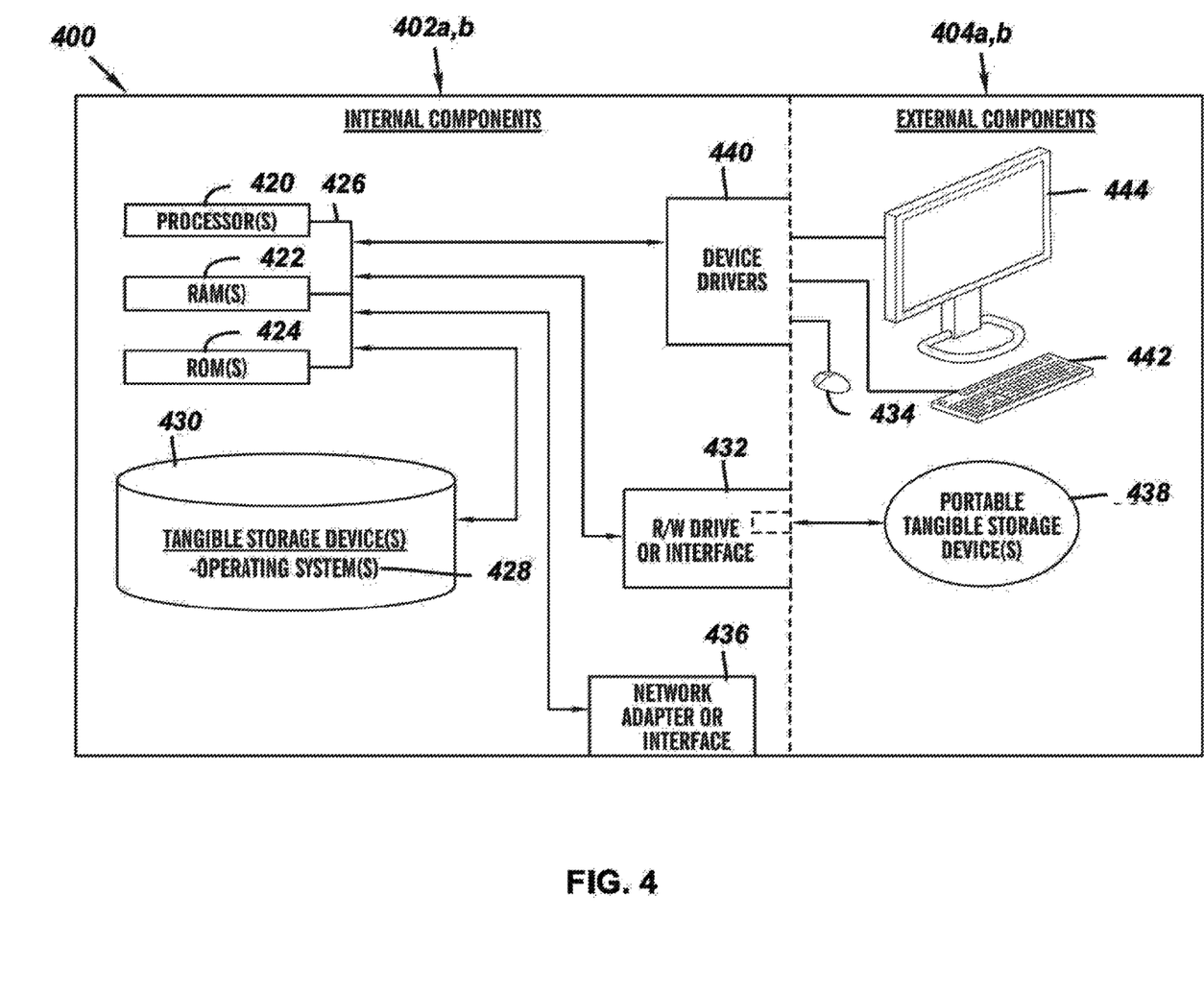
FIG. 4 is a block diagram of internal and external components of computers and servers depicted in FIG. 1 according to at least one embodiment.

FIG. 4 is a block diagram of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the autonomous pending notification deletion program 110A in the client computing device 102 and the autonomous pending notification deletion program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as an autonomous pending notification deletion program 110A, 110B can be stored on one or more of the respective portable computer-readable tangible storage devices 438, read via the respective R/W drive or interface 432 and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the autonomous pending notification deletion program 110A in the client computing device 102 and the autonomous pending notification deletion program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the autonomous pending notification deletion program 110A in the client computing device 102 and the autonomous pending notification deletion program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
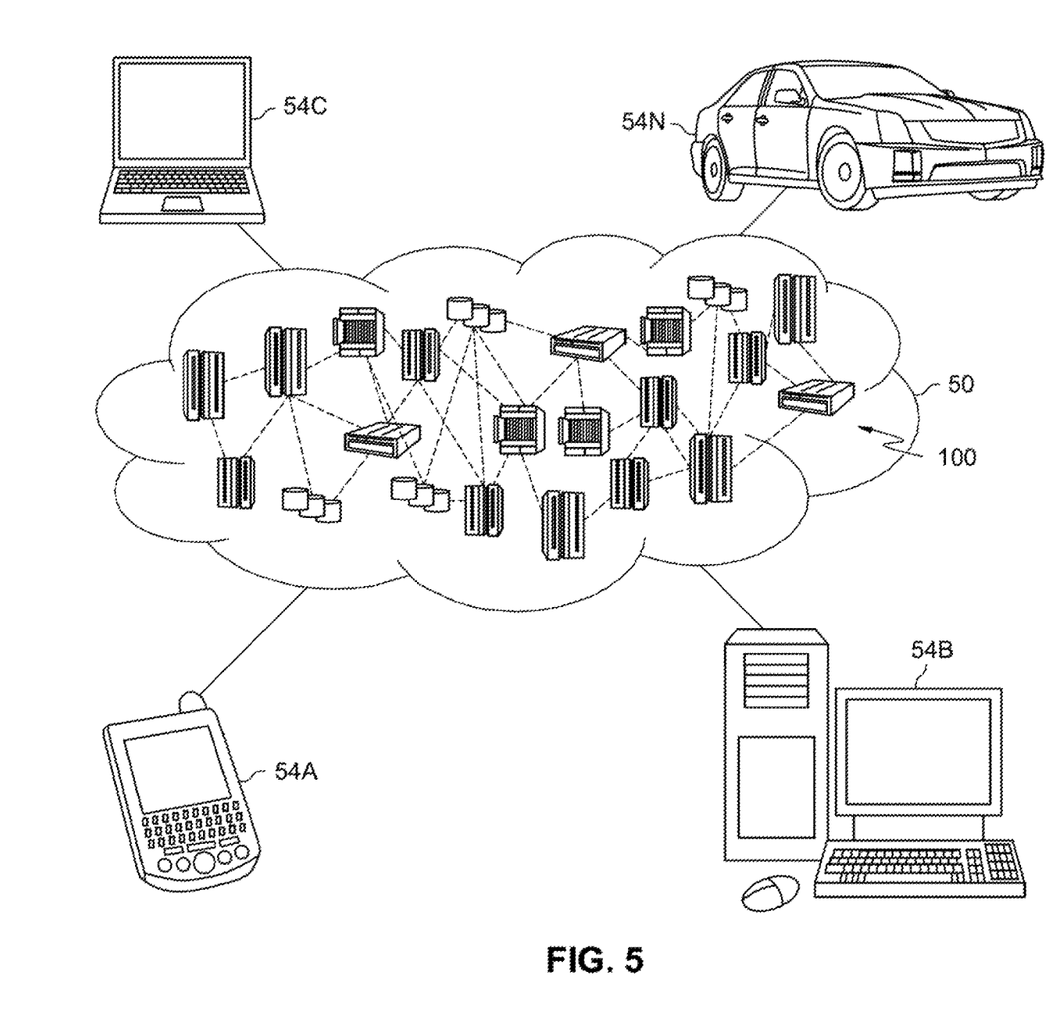
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
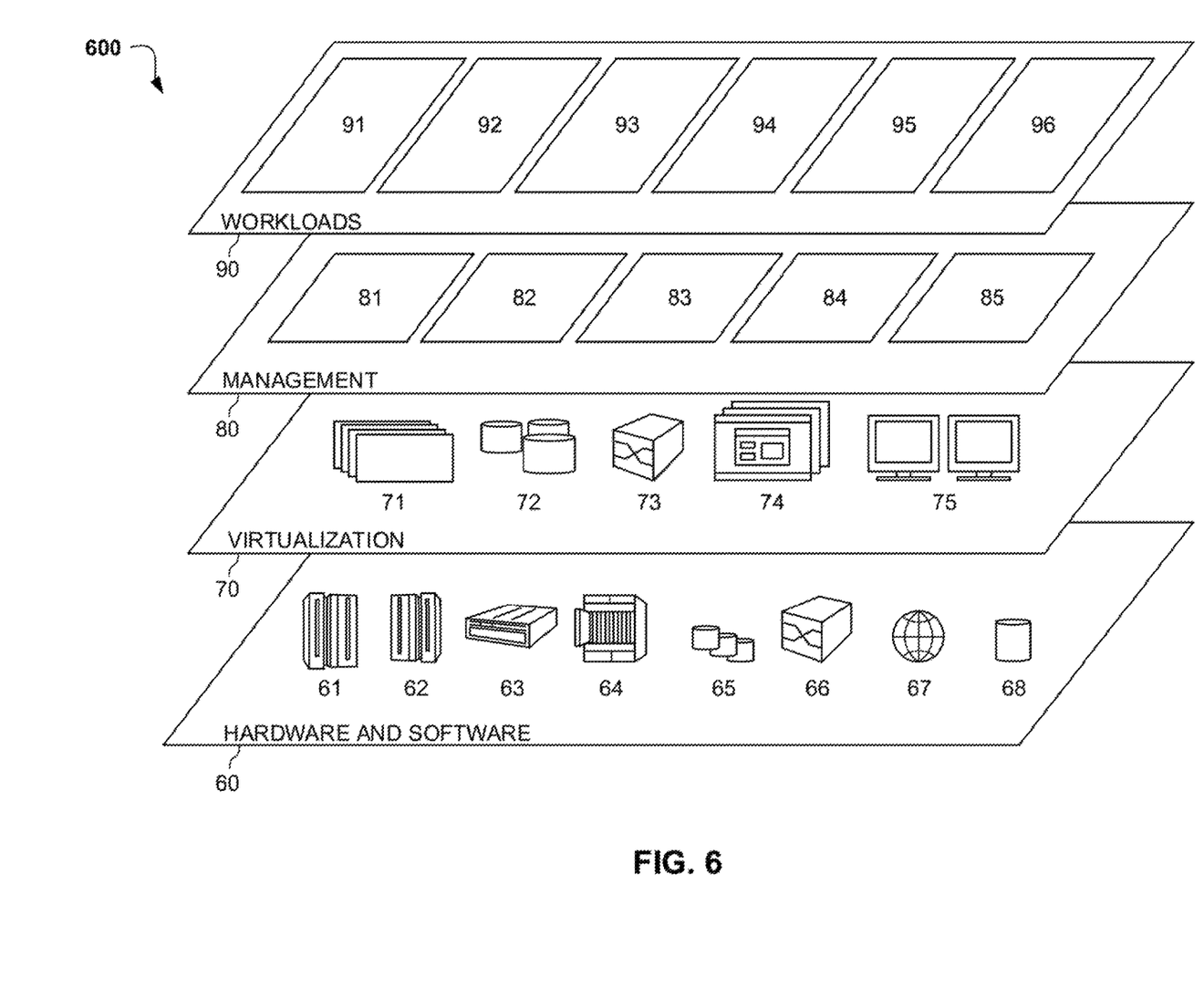
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and autonomous pending notification deletion 96. Autonomous pending notification deletion 96 may relate to managing pending mobile notifications for time and location sensitive events.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for autonomous pending notification deletion, the method comprising:
   receiving a notification queue associated with a user on a user device;
   retrieving data related to multiple notifications from a user electronic calendar;
   determining a user current location;
   comparing each notification in the notification queue against the determined user current location;
   deriving a notification decision model based on the received notification queue, retrieved data, and the user current location, one or more notifications related to the determined current location of the user are automatically deleted simultaneously or almost simultaneously as the user leaves the determined current location, the derived notification decision model is generated in table form based on information related to model categories, model component attributes and potential values associated with the model categories and the model component attributes; and
   performing an action to manage the notification queue based on the derived notification decision model, wherein criteria within user preferences and messages in the notification queue is defined by the user and specific rules are generated to denote usage criteria of the notification queue.

2. The method of claim 1, wherein the action to manage the user notification queue comprises deleting expired notifications based on the user current location, an expiration date, and an expiration time.

3. The method of claim 1, wherein the action to manage the user notification queue comprises suppressing notifications based on a calendar event and a status of the calendar event.

4. The method of claim 1, further comprising:
   deleting, automatically, a notification when the notification is sales-based or advertisement-based and a user has predefined removal parameters to delete the notification.

5. The method of claim 1, further comprising:
   parsing content of user messages found in the user electronic calendar, emails, or text messages utilizing a natural language processing technique.

6. The method of claim 1, further comprising:
   deleting an icon badge on a user smartphone when a notification has expired.

7. The method of claim 1, further comprising:
performing an action to manage the user notification queue when a preconfigured threshold criterion is met.

8. A computer system for autonomous pending notification deletion, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
receiving a notification queue associated with a user on a user device;
retrieving data related to multiple notifications from a user electronic calendar;
determining a user current location;
comparing each notification in the notification queue against the determined user current location;
deriving a notification decision model based on the received notification queue, retrieved data, and the user current location, one or more notifications related to the determined current location of the user are automatically deleted simultaneously or almost simultaneously as the user leaves the determined current location, the derived notification decision model is generated in table form based on information related to model categories, model component attributes and potential values associated with the model categories and the model component attributes; and
performing an action to manage the notification queue based on the derived notification decision model, wherein criteria within user preferences and messages in the notification queue is defined by the user and specific rules are generated to denote usage criteria of the notification queue.

9. The computer system of claim 8, wherein the action to manage the user notification queue comprises deleting expired notifications based on the user current location, an expiration date, and an expiration time.

10. The computer system of claim 8, wherein the action to manage the user notification queue comprises suppressing notifications based on a calendar event and a status of the calendar event.

11. The computer system of claim 8, further comprising:
deleting, automatically, a notification when the notification is sales-based or advertisement-based and a user has predefined removal parameters to delete the notification.

12. The computer system of claim 8, further comprising:
parsing content of user messages found in the user electronic calendar, emails, or text messages utilizing a natural language processing technique.

13. The computer system of claim 8, further comprising:
deleting an icon badge on a user smartphone when a notification has expired.

14. The computer system of claim 8, further comprising:
performing an action to manage the user notification queue when a preconfigured threshold criterion is met.

15. A computer program product for autonomous pending notification deletion, the computer program product comprising:
one or more computer-readable tangible storage media and program instructions stored on at least one of the one or more non-transitory tangible storage media, the program instructions executable by a processor of a computer to perform a method, the method comprising:
receiving a notification queue associated with a user on a user device;
retrieving data related to multiple notifications from a user electronic calendar;
determining a user current location;
comparing each notification in the notification queue against the determined user current location;
deriving a notification decision model based on the received notification queue, retrieved data, and the user current location, one or more notifications related to the determined current location of the user are automatically deleted simultaneously or almost simultaneously as the user leaves the determined current location, the derived notification decision model is generated in table form based on information related to model categories, model component attributes and potential values associated with the model categories and the model component attributes; and
performing an action to manage the notification queue based on the derived notification decision model, wherein criteria within user preferences and messages in the notification queue is defined by the user and specific rules are generated to denote usage criteria of the notification queue.

16. The computer program product of claim 15, wherein the action to manage the user notification queue comprises deleting expired notifications based on the user current location, an expiration date, and an expiration time.

17. The computer program product of claim 15, wherein the action to manage the user notification queue comprises suppressing notifications based on a calendar event and a status of the calendar event.

18. The computer program product of claim 15, further comprising:
deleting, automatically, a notification when the notification is sales-based or advertisement-based and a user has predefined removal parameters to delete the notification.

19. The computer program product of claim 15, further comprising:
parsing content of user messages found in the user electronic calendar, emails, or text messages utilizing a natural language processing technique.

20. The computer program product of claim 15, further comprising:
performing an action to manage the user notification queue when a preconfigured threshold criterion is met.

* * * * *